US007729900B2

(12) United States Patent
Moore et al.

(10) Patent No.: US 7,729,900 B2
(45) Date of Patent: Jun. 1, 2010

(54) METHOD AND COMPUTER-READABLE MEDIUM FOR CONSISTENT CONFIGURATION OF LANGUAGE SUPPORT ACROSS OPERATING SYSTEM AND APPLICATION PROGRAMS

(75) Inventors: Thomas G. Moore, Duvall, WA (US); David Yalovsky, Seattle, WA (US); Mohamed Anas Abbar, Redmond, WA (US); Athapan Arayasantiparb, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 952 days.

(21) Appl. No.: 10/953,676

(22) Filed: Sep. 29, 2004

(65) Prior Publication Data

US 2006/0074627 A1 Apr. 6, 2006

(51) Int. Cl.
*G06F 17/27* (2006.01)
(52) U.S. Cl. .............................. 704/9; 704/8; 715/264; 715/265; 715/866
(58) Field of Classification Search ................. 715/264, 715/265, 866
See application file for complete search history.

(56) References Cited

U.S. PATENT DOCUMENTS

| 5,428,772 | A |   | 6/1995  | Merz                    |
|-----------|---|---|---------|-------------------------|
| 5,432,935 | A | * | 7/1995  | Kato et al. ...... 719/320 |
| 5,778,361 | A |   | 7/1998  | Nanjo et al. ...... 707/5 |
| 5,790,115 | A |   | 8/1998  | Pleyer et al. ...... 345/327 |
| 5,966,719 | A |   | 10/1999 | Okumura ...... 707/536   |
| 6,014,616 | A |   | 1/2000  | Kim                     |
| 6,035,269 | A |   | 3/2000  | Kim ...... 704/9        |
| 6,157,905 | A |   | 12/2000 | Powell ...... 704/2     |
| 6,216,102 | B1|   | 4/2001  | Martino et al. ...... 704/9 |
| 6,254,177 | B1|   | 7/2001  | Tseng ...... 297/54     |
| 6,272,456 | B1|   | 8/2001  | de Campos ...... 704/8  |
| 6,381,567 | B1|   | 4/2002  | Christensen et al.      |
| 6,396,515 | B1|   | 5/2002  | Hetherington et al. ...... 345/762 |
| 6,401,060 | B1|   | 6/2002  | Critchlow et al. ...... 704/1 |

(Continued)

OTHER PUBLICATIONS

Fox, Andrew L.; Swain, Deborah, "Technical Translation For Multiple-Language Support," International Professional Communication Conference (IPCC '89): Communicating To The World; IEEE Professional Communication Soc., New York, 1989, p. 156-161.

(Continued)

*Primary Examiner*—Richemond Dorvil
*Assistant Examiner*—Leonard Saint Cyr
(74) *Attorney, Agent, or Firm*—Merchant & Gould

(57) ABSTRACT

A method and computer-readable medium are provided for consistent configuration of language support between an operating system and application programs. According to the method, an integrated process is provided for receiving and implementing one or more language settings for an operating system and one or more language settings for application programs. The integrated process includes prompting a user for new language settings for both the operating system and the application programs. The language settings for the operating system may include language group support, user interface language, keyboard layout, preferences for standards and formats, and other settings. The language settings for the application programs may include preferences for a user interface language and a default language for use in the application programs. Once the language settings have been received from the user, the new settings may be applied and utilized in future operations of the computer system.

19 Claims, 7 Drawing Sheets

U.S. PATENT DOCUMENTS

| | | | |
|---|---|---|---|
| 6,501,486 B1 | 12/2002 | Lau | 345/762 |
| 6,562,078 B1 | 5/2003 | Yang et al. | 715/535 |
| 6,662,362 B1 | 12/2003 | Arora et al. | 717/154 |
| 6,675,143 B1 | 1/2004 | Barnes et al. | 704/257 |
| 2002/0087588 A1* | 7/2002 | McBride et al. | 707/204 |
| 2002/0116172 A1 | 8/2002 | Vargas | 704/8 |
| 2002/0144105 A1 | 10/2002 | Real | 713/2 |
| 2002/0156902 A1* | 10/2002 | Crandall | 709/228 |
| 2003/0081017 A1 | 5/2003 | Shenassa et al. | |

OTHER PUBLICATIONS

Chinese Official Action dated May 9, 2008 cited in Application No. 200510097870.6.

Chinese Second Office Action dated Dec. 5, 2008 cited in Application No. 200510097870.6.

Chinese Third Office Action dated Apr. 17, 2009 cited in Application No. 200510097870.6.

Chinese Fourth Office Action dated Oct. 9, 2009 cited in Application No. 200510097870.6.

* cited by examiner

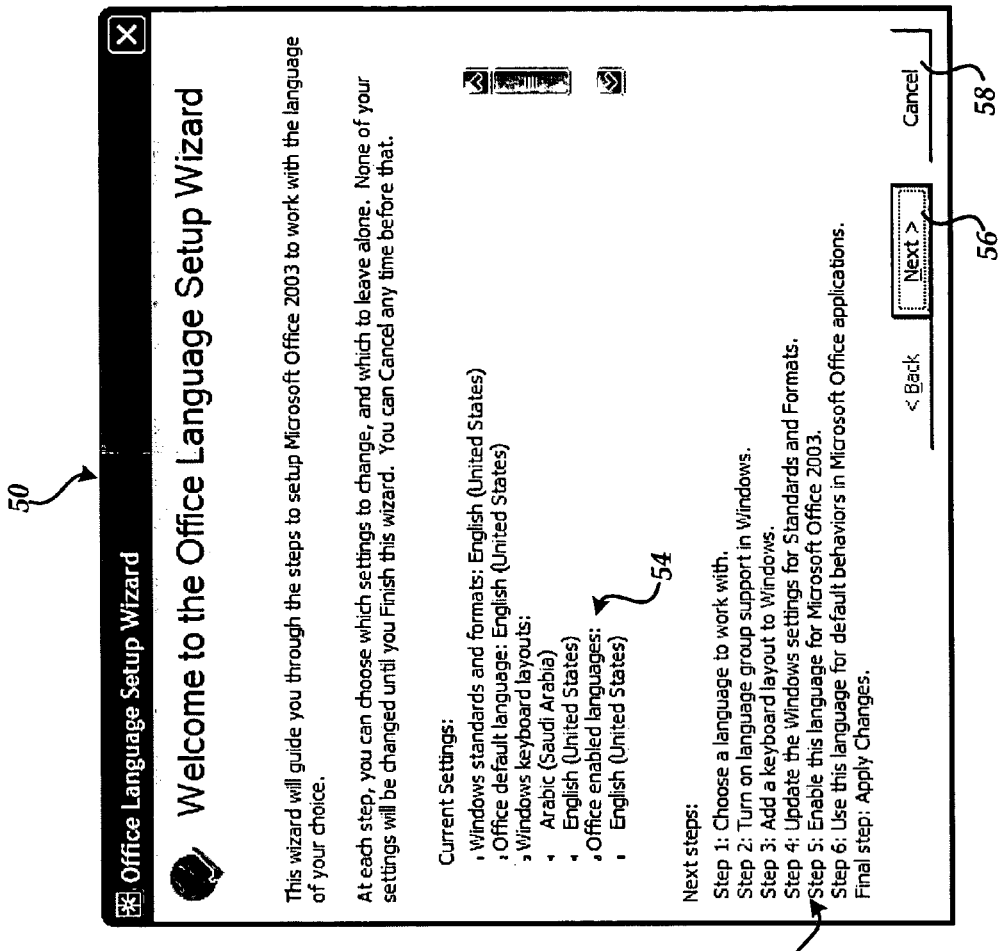
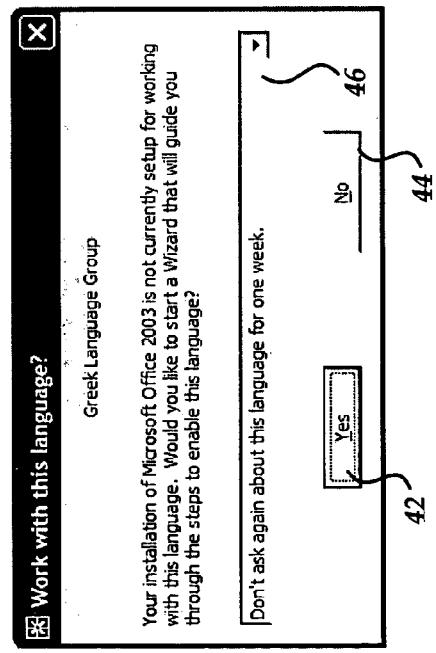
Fig.5.
Fig.4.

METHOD AND COMPUTER-READABLE MEDIUM FOR CONSISTENT CONFIGURATION OF LANGUAGE SUPPORT ACROSS OPERATING SYSTEM AND APPLICATION PROGRAMS

BACKGROUND OF THE INVENTION

Modern desktop computer systems allow users to operate the computer using many different languages. For instance, modern computer systems can display their user interface in English, Chinese, Hebrew, and many other languages. Additionally, keyboard layouts and input mechanisms can be configured to provide support for inputting text in the supported languages. Language support is typically implemented by both the computer operating system and by applications executing on the operating system, such as word processing programs and World Wide Web ("web") browsers.

Language support provided by an operating system typically includes displaying system messages in the selected language, configuring keyboard layouts for input, setting number, time, currency, and other formats appropriate for use with the selected language, installing fonts needed to support the selected language, and other functions. Language support provided by application programs includes support for rendering web pages in a specified language, utilizing a spell check dictionary appropriate for the specified language, and other similar functions.

In order to configure language support in an operating system and in various application programs, a user may have to be familiar with many different control panels, options menus, and all of the possible configuration options. This process can be very confusing for a user. In fact, in many cases a user may be unaware that they need to configure language support in both the operating system and the application programs. This may result in language support that is properly configured for only the operating system or the application program. Moreover, it may be difficult for a user to understand all of the settings offered by the various control panels and settings dialogs required to configure language support in both the operating system and application programs. It can therefore be extremely difficult for a user to correctly configure their computer system for operation using the language of their choice.

It is with respect to these considerations and others that the various embodiments of the present invention have been made.

BRIEF SUMMARY OF THE INVENTION

In accordance with the embodiments of the present invention, the above and other problems are solved by a method and computer-readable medium for consistently configuring language support across an operating system and one or more application programs. By providing an integrated process for configuring language settings, users can quickly and consistently specify language settings for both an operating system and application programs. Moreover, because the integrated process may be executed in response to determining that language settings are not consistently configured, the settings can be consistently configured even when a user is unaware that the settings are incorrect.

According to one aspect of the invention, a method is provided for consistently configuring language support across an operating system and one or more application programs. According to the method, an integrated process is provided for receiving and implementing one or more language settings for an operating system and one or more language settings for application programs. The integrated process may be executed in response to determining that a user is working in a language for which language support is not consistently deployed. This may occur, for instance, if a user is utilizing a word processing application program to type a document in a language for which support has not been configured. The integrated process may also be executed in response to determining that language support is not consistently configured for both the operating system and the application programs. This may occur, for instance, if the user configures language support in only either the operating system or the application programs. The integrated process may also be launched in response to a user request.

According to other aspects of the invention, the integrated process includes displaying to a user one or more current language settings for the operating system and one or more current language settings for the application programs. The user may then be prompted for new language settings for both the operating system and the application programs. The language settings for the operating system may include language group support, keyboard layout, preferences for standards and formats, and other settings. The language settings for the application programs may include preferences for a default language for use in the application programs. Language settings may also be specified that apply both to the operating system and to the application programs, such as a setting for a user interface language. Once the language settings have been received from the user, the new settings may be applied and utilized in future operations of the computer system.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIGS. 4-8 are screen diagrams showing illustrative screen displays utilized in the various embodiments of the invention.

DETAILED DESCRIPTION OF THE INVENTION

Figure 1:
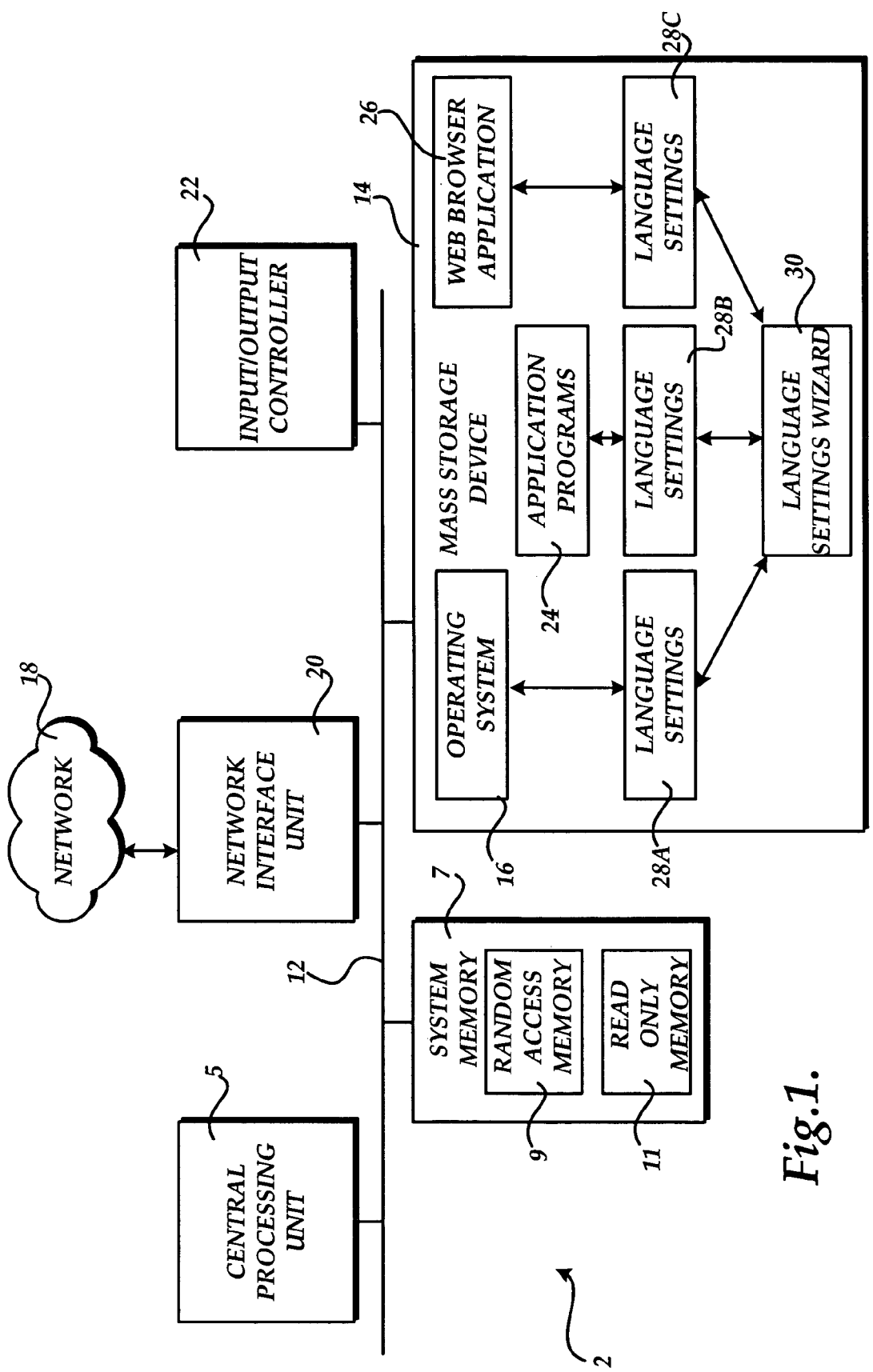
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented and to illustrate several aspects of the embodiments of the invention. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. As known to those skilled in the art, the operating system 16 may support various language related features. For instance, the operating system 16 may be able to display messages and system information in any language selected by a user. In order to enable the operating system related language features, a user typically utilizes a control panel provided by the operating system to specify one or more operating system language settings 28A. As will be described in greater detail below, the embodiments of the present invention provide a language settings wizard 30 for quickly and easily setting both the operating system language settings 28A and also one or more application program language settings 28B and 28C.

The mass storage device 14 and RAM 9 may also store one or more program modules. In particular, the mass storage device 14 and the RAM 9 may store one or more application programs 24. According to embodiments of the invention, the application programs 24 comprise the OFFICE productivity application suite from MICROSOFT CORPORATION. As shown in FIG. 1, the application programs 24 utilize language settings 28B to provide language-specific features to a user. For instance, the language settings 28B specify languages enabled for use with the application programs 24 and a default language. In order to set the application program language settings 28B, a user typically has to utilize menus and other interfaces provided by the application programs 24. As will be described in greater detail below, aspects of the invention provide a language settings wizard 30 for setting both the application program language settings 28B and the operating system language settings 28A. It should be appreciated that although the embodiments of the invention are described in the context of the OFFICE productivity application suite, the application programs 24 may comprise any type of computer programs that utilize language settings to provide custom language functionality to a user.

According to aspects of the invention, the mass storage device 14 and RAM 9 may also store a web browser application 26, such as the INTERNET EXPLORER web browser application from MICROSOFT CORPORATION. The web browser application 26 also allows a user to set one or more language settings 28C that define the language in which menus and dialog boxes will be displayed. The web browser application 26 also allows a user to specify one or more languages for use with web sites that display content in more than one language. In order to specify the web browser language settings 28C, a user must utilize menus provided by the web browser 26. As will be described in greater detail below, the language settings wizard 30 provides an integrated process for setting the web browser language settings 28C along with the operating system language settings 28A and the application program language settings 28B. Additional details regarding the operation of the language settings wizard are provided below with respect to FIGS. 2-8.

Figure 2:
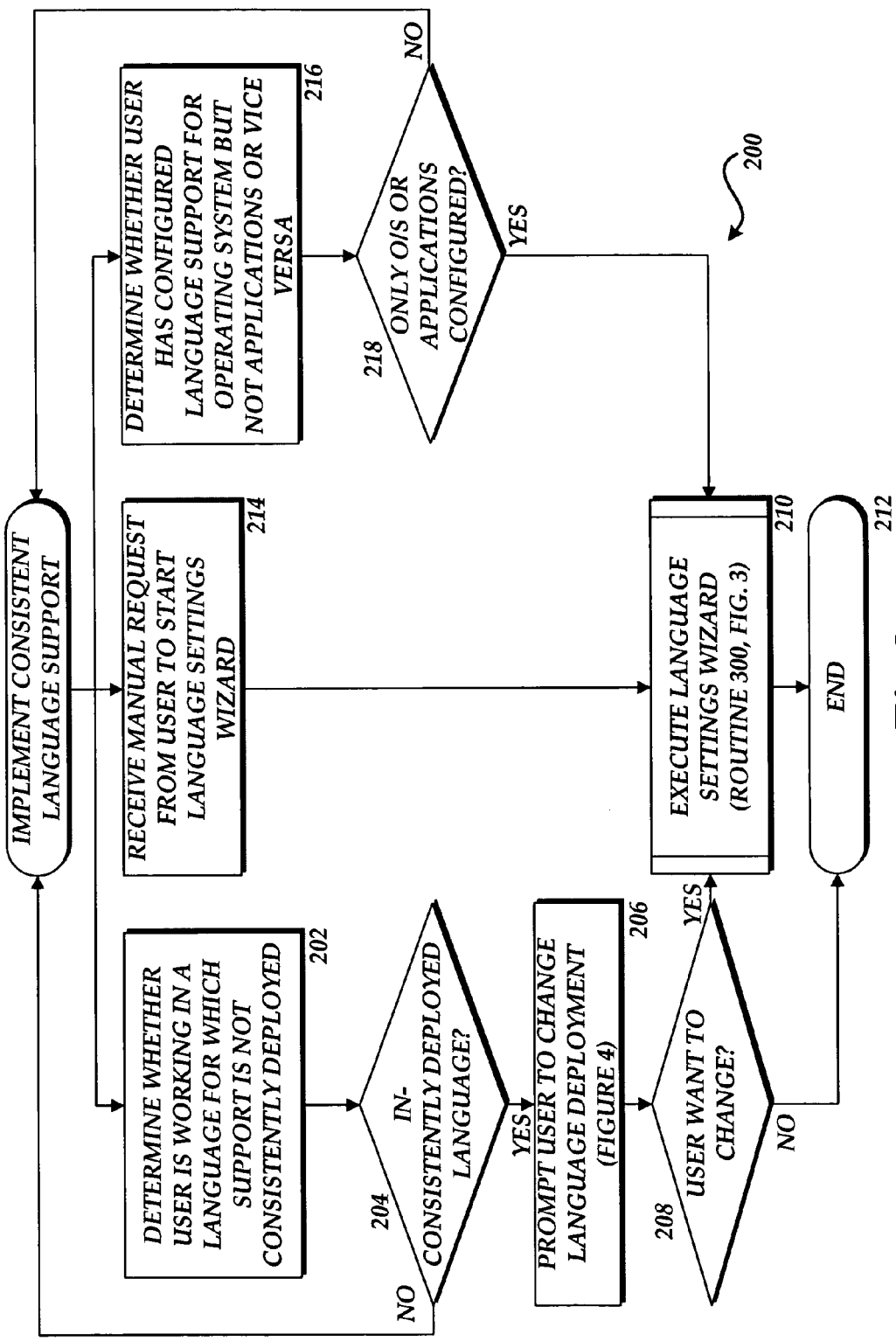
FIG. 2 is a flow diagram showing an illustrative process for implementing consistent language support across an operating system and application programs in one embodiment of the invention.

Referring now to FIG. 2, an illustrative routine 200 will be described illustrating a process performed by the language settings wizard 30 for consistently configuring language support across an operating system and one or more application programs. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 2-3, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 2, an illustrative routine 200 will be described for implementing consistent language support for an operating system and one or more application programs. As will be described in greater detail below, the routine 200 illustrates a process for launching the language settings wizard 30 in response to the detection of certain conditions. By launching the language settings wizard 30 in response to these conditions, a user may be directed to the language settings wizard 30 when a determination is made that the language settings for the operating system 16 and the application programs 24 have been made in an inconsistent manner. The user may also manually launch the wizard 30.

One path for the execution of the routine 200 begins at operation 202, where a determination is made as to whether a user is working within the application programs 24 in a language for which support is not currently configured. For language writing systems (sometimes called "scripts") that have no languages currently enabled for use with the application programs 24, the detection process examines whether characters from the script are present in the user's document. If characters are present, the user may be prompted to configure the application programs 24 for use with the language at operation 206. If the user desires to change the language, the routine 200 will branch to operation 210, where the language settings wizard 30 will be executed. An illustrative routine 300 describing the operation of the language settings wizard 30 is described below with respect to FIG. 3.

For languages that are not currently configured, but that share the writing system with other configured languages (for example, Spanish is not enabled, but French is enabled), then the detection process requires a more complicated system than just looking at individual characters. For these cases, program code is executed that searches for the presence of certain words. The words are chosen to be indicators of a certain language being used. In particular, for each language a list is created that contains a collection of somewhat-common words for that language, which do not appear to exist in any other known languages.

The list of indicator words for each language is constructed in a manner to minimize the possibility of accidentally including a word that exists in other languages. The number of words chosen for the list is also selected carefully. For example, making the list too small could make it difficult to detect a language, since the user might never use those particular words. Some words are used in place names, which are then used in other languages, so it might be a poor idea to include such words in the indicator list for their language of origin.

Accordingly, in view of the above, if it appears at operation 204 that the user is working in an inconsistently deployed language (e.g. a user is typing in German when the application programs have been configured for use in English), the routine 200 will continue from operation 204 to operation 206. It should also be appreciated that the routine 200 may continue from operation 204 to operation 206 in response to determining that the user is working in a language that is consistently not deployed. For instance, if the user is working with German text and the operating settings are inconsistent with the application settings for German, then the language is inconsistently deployed. However, if the operating system and the application programs are in consistent agreement that the support for German is not deployed, then the user will still be prompted to add support for the German language. It should be appreciated that the term "inconsistently deployed" encompasses both scenarios.

At operation 206, the user may be prompted to enable the language that appears to be mis-configured. An illustrative user interface for providing such a prompt is shown in FIG. 4. As shown in FIG. 4, a dialog box 40 may be displayed to the user with an indication that the application programs 24, operating system, or web browser have not been configured or have been mis-configured for use with the language or language group. The dialog box 40 may also ask the user if they would like to be directed to the language settings wizard 30 to enable the language. If the user chooses the "YES" button 42, the routine 200 branches to operation 210, where the language settings wizard 30 is executed. If the user chooses the "NO" button 44, the routine 200 branches to operation 212, where it ends. According to one embodiment of the invention, the dialog box 40 also includes a pull-down menu 46 that allows a user to specify a period of time within which they are not to be bothered with a request to install support for the specified language. A user may also specify that they not be bothered about any languages whatsoever within a specified period of time.

Another path for execution of the routine 200 begins at operation 216, where a determination is made as to whether the user has configured language support for the operating system 16 but not for the application programs 24 or vice versa. This determination may be made in response to the user utilizing a control panel provided by the operating system 16 to configure the operation system language settings 28A. In such a case, the user may be prompted to utilize the language settings wizard 30 to also configure the application program language settings 28B. Alternatively, the determination may be made in response to the user utilizing a menu provided by the application programs 24 to configure the application program language settings 28B. In such a case, the user may be prompted to utilize the language settings wizard 30 to also configure the operating system language settings 28A. If only the operating system or application program language settings have been configured, the routine 200 continues to operation 210 where the language settings wizard 30 is executed. It should also be appreciated that the language settings wizard 30 may also be started in response to a user request at operation 214.

Figure 3:
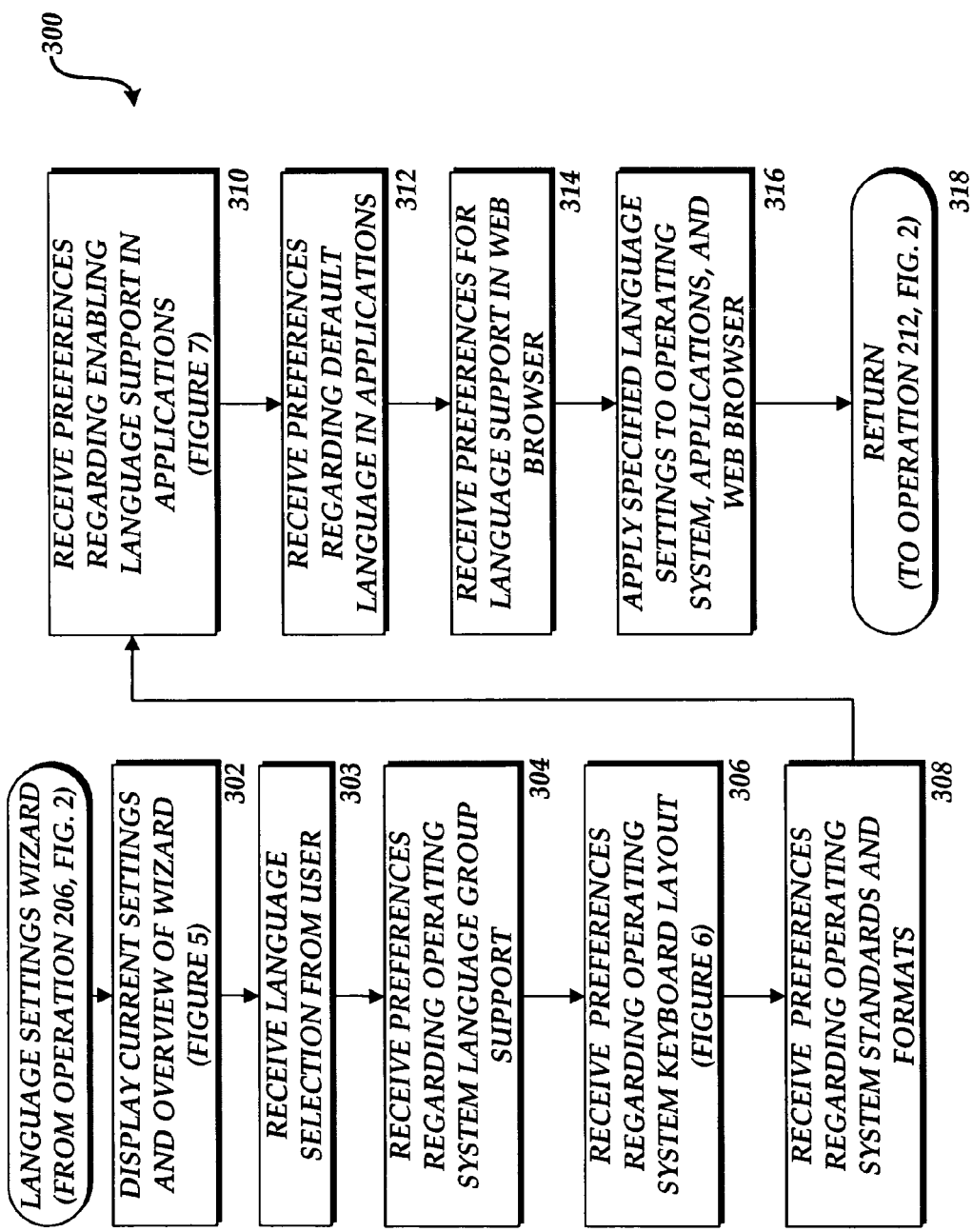
FIG. 3 is a flow diagram showing an illustrative process for implementing a language settings wizard according to one embodiment of the invention.

Turning now to FIG. 3, an illustrative process 300 will be described showing the operation of the language settings wizard 30 according to one embodiment of the invention. The routine 300 begins at operation 302, where the current language settings for the operating system 16 and the application programs 24 are displayed to the user. An illustrative user interface for providing such a display is shown in FIG. 5. As shown in FIG. 5, a dialog box 50 may be displayed to the user with a text field identifying the current language settings for the operating system 16 and the application programs 24. The dialog box 50 may also include a text field 52 that identifies to the user the next steps to be taken in the wizard. If the user selects the "NEXT" button 56, the routine 300 continues to operation 303. If the user selects the "CANCEL" button 58, the operation of the language settings wizard 30 is ended.

At operation 303, the user may be permitted to select a language to work with in regard to the settings in the rest of the wizard. According to one embodiment, a drop-down list may be presented that identifies the languages that the wizard can set things up for. If the wizard was launched in response to a language detection, the detected language may be initially selected in the list. If the user manually launched the wizard, then the user must manually select the language to be configured. This step allows the user to specify the language they want to set up, and/or to correct if an incorrect detection was made. The language selected here in this step is then the language for which all of the settings are applied in the following steps. In other words, it the user chooses Polish here, then the choices in the keyboard step described below will be about the Polish keyboard, not some other language keyboard. From operation 303, the routine 300 continues to operation 304.

At operation 304, the user is prompted to enable language group support within the operating system 16. Group support refers to installing and enabling the necessary components within the operating system 16 to enable support for groups of languages. According to one embodiment of the invention, the language groups include a complex scripts group that includes the languages of India, Thailand, Vietnam, Arabic, and Hebrew; an east Asian ideographic group that includes Chinese, Japanese, and Korean; and an alphabetic group that includes the western European, Greek, Cyrillic, and other alphabetic types of languages. By enabling support for a group of languages, the fonts and other necessary items to support the language are installed and configured. It should be appreciated that the operation 304 may be skipped if the language group in question is already supported by the operating system.

Figure 6:
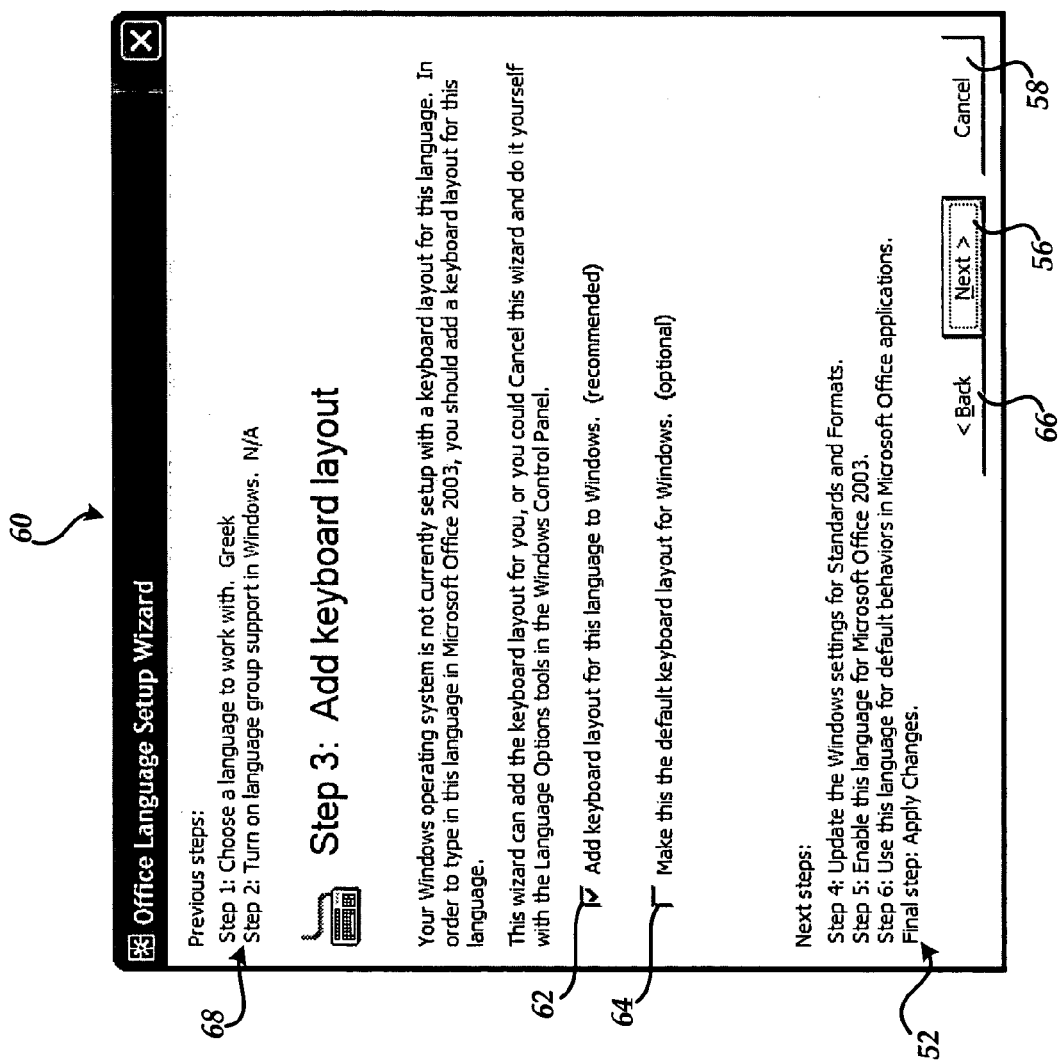

From operation 304, the routine 300 continues to operation 306, where preferences are received from the user regarding the operating system keyboard layout. An illustrative user interface for receiving such input is shown in FIG. 6. As shown in FIG. 6, a dialog box 60 may be display through which the user can add a keyboard layout for a language and select whether the keyboard layout should be the default keyboard layout. In particular, a check box 62 is provided for indicating whether a keyboard layout for the selected language should be added for use with the operating system 16. A check box 64 is also provided for indicating that the identified keyboard layout should be the default keyboard layout. As shown in FIG. 6, the dialog box 60 also includes the text regions 68 and 52 for indicating the previous and next steps of the wizard, respectively. If the user selects the "NEXT" button 56, the routine 300 continues to operation 308. If the user selects the "BACK" button 66, the routine returns to the operation 304. If the user selects the "CANCEL" button 58, the operation of the language settings wizard 30 is ended.

At operation 308, the user is prompted for preferences regarding operating system standards and formats. In particular, language support may include custom date formats, time formats, currency formats, number formatting, and other standards and formats. At operation 308, a dialog box is presented to the user through which they may select the appropriate standards and formats for use with the enabled language. Once the user has completed specifying the standard and format preferences, the routine 300 continues to operation 310.

Figure 7:
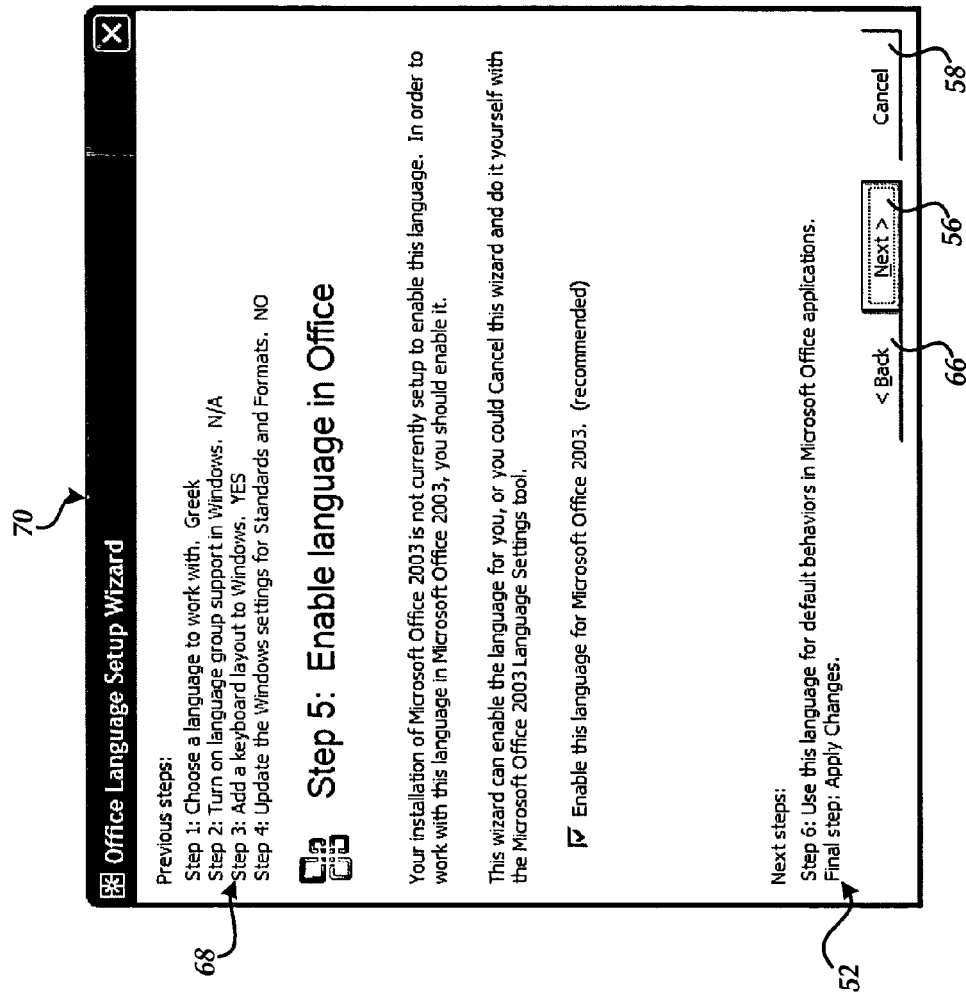

At operation 310, preferences are received from the user regarding language support in the application programs 24. FIG. 7 shows an illustrative user interface for receiving these preferences from a user. In particular, the dialog box 70 is presented to the user. The dialog box 70 indicates that the application programs 24 are not currently setup to enable the selected language. The dialog box 70 also includes a check box that allows the user to specify that the language be enable for use with the application programs 24. By enabling the language for use with the application programs 24, certain language specific features will be enabled within the application programs. For instance, a spell checker dictionary may be utilized that is customized for the enabled language. As shown in FIG. 7, the dialog box 70 also includes the text regions 68 and 52 for indicating the previous and next steps of the wizard, respectively. If the user selects the "NEXT" button 56, the routine 300 continues to operation 312. If the user selects the "BACK" button 66, the routine returns to the operation 308. If the user selects the "CANCEL" button 58, the operation of the language settings wizard 30 is ended.

From operation 312, the routine 300 continues to operation 314 where preferences are received from the user regarding language support in the web browser 26. In particular, the user may be permitted to select the preferred language for use within the web browser application 26 and may be able to specify the installed languages for use with web sites that provide content in more than one language. Once the user has set the web browser language settings 28C, the routine 300 continues to operation 316.

Figure 8:
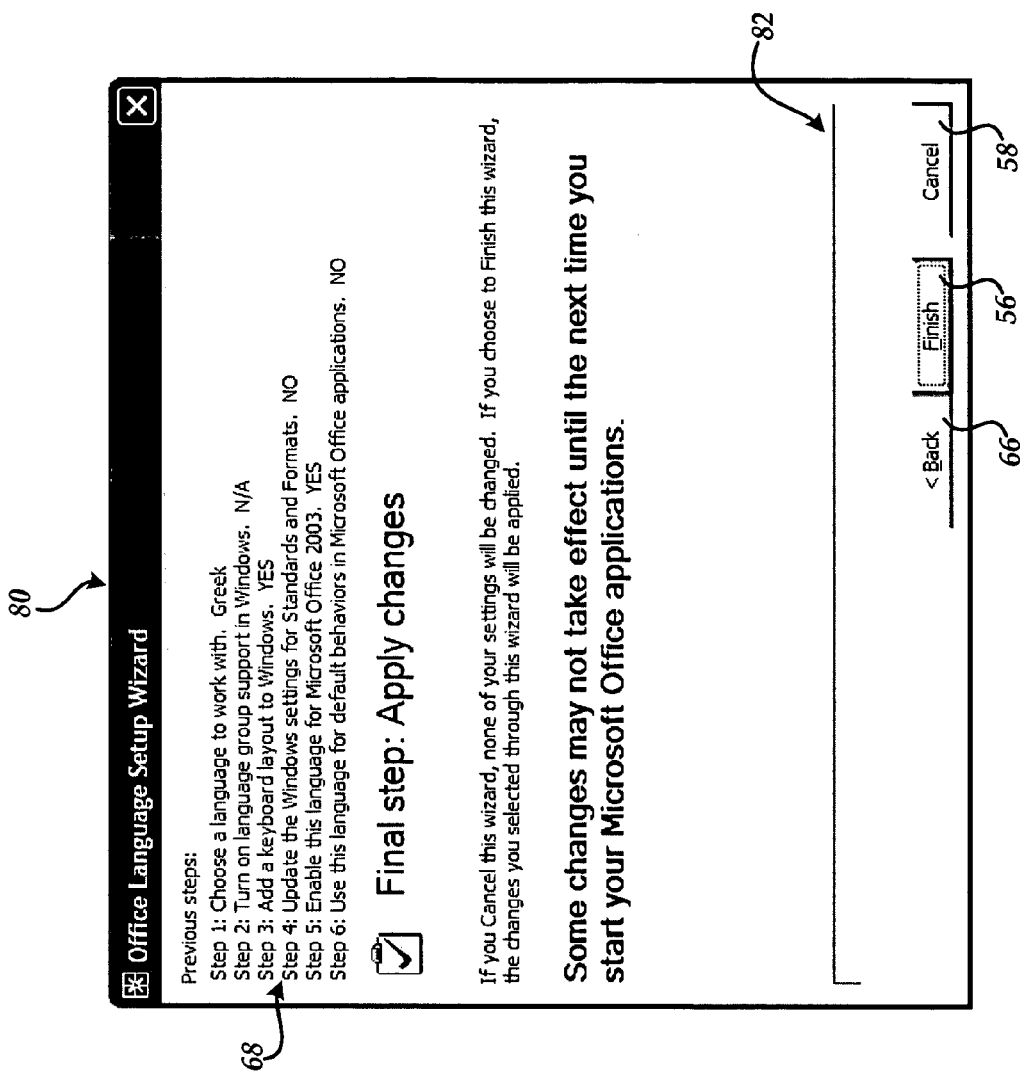

At operation 316, the user is prompted to apply the specified operating system language settings 28A, the application program language settings 28B, and the web browser language settings 28C. In particular, the dialog box 80 shown in FIG. 80 may be displayed to the user. As shown in FIG. 8, the dialog box 80 includes a text region 68 for indicating the previous steps of the wizard. If the user selects the "FINISH" button 56, the changes are applied and the routine 300 continues to operation 318, where it returns. If the user selects the "BACK" button 66, the routine returns to the operation 314. If the user selects the "CANCEL" button 58, the operation of the language settings wizard 30 is ended and none of the user-specified settings are applied.

It should be appreciated that, according to one embodiment of the invention, the application language settings 28C may include the identities of one or more "enabled" languages. Enabled languages are those languages for which language-specific features are displayed to the user. If support for a large number of languages is installed, a large number of language-specific features may also be displayed. This may be confusing to a user. Accordingly, the user is permitted to select the enabled languages for which the language-specific features should be displayed. Language-specific features are hidden that correspond to languages that are not enabled.

Based on the foregoing, it should be appreciated that the various embodiments of the invention include a method, system, apparatus, and computer-readable medium for consistently configuring language support across an operating system and one or more application programs. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for consistently configuring language support across an operating system and at least one application program, the method comprising:
    determining, by a processor, whether characters present in the at least one application program are in a language writing system for which the language support is not currently enabled for the at least one application program;
    determining, in response to determining that the characters present in the at least one application program are in the language writing system for which the language support is not currently enabled, that a user is working in a language associated with the language writing system for which the language support is not consistently deployed; and
    providing, in response to determining that the user is working in the language associated with the language writing system for which the language support is not consistently deployed, an integrated process for receiving and implementing at least one first language setting for the operating system and at least one second language setting for the at least one application program, wherein the integrated process comprises:
        prompting the user to enable the language support that is not currently enabled, wherein the user is directed to a language support settings wizard to enable the language support for the language associated with the language writing system, wherein prompting the user to enable the language support that is not currently enabled comprises providing the user with an option to specify a period of time for which the language settings wizard is not to be executed in response to determining one of the following: that the user is working in the language associated with the language writing system, and that the user is working in any language not consistently deployed by the language support,
        displaying the at least one first language setting for the operating system and the at least one second language setting for the at least one application program,
        prompting the user to specify the at least one first language setting for the operating system and the at least one second language setting for the at least one application program, wherein a list of languages corresponding to the at least one first language setting and the at least one second language setting is displayed for the user to specify the language to be associated with at least one first language setting and the at least one second language setting, and
        receiving, from the user, the at least one first language setting selection for the operating system and the at least one language setting for the at least one application program, wherein receiving the at least one first language setting selection for the operating system comprises receiving operating system standards and format settings for the language support, the operating system standards and format settings comprising at least one of the following: custom date formats, time formats, currency formats, and number formats.

2. The method of claim 1, wherein the at least one first language setting for the operating system comprise preferences for operating system language group support.

3. The method of claim 2, wherein operating language group support comprises language groups categorized by a complex script language group, an ideographic language group, and an alphabetic language group.

4. The method of claim 1, wherein the at least one first language setting for the operating system comprises preferences for an operating system keyboard layout.

5. The method of claim 1, wherein the at least one second language setting for the at least one application program comprises preferences for setting a default language for use in the at least one application program.

6. The method of claim 1, wherein the at least one second language setting for the at least one application program comprises preferences for language support in a web browser application program.

7. The method of claim 1, wherein the at least one second language setting for the at least one application program comprises a selection of at least one language for which language-specific features should be displayed.

8. The method of claim 1, wherein the integrated process further comprises applying the received at least one first language setting for the operating system and the received at least one second language setting for the at least one application program.

9. The method of claim 1, wherein the language support settings wizard is operative to be executed manually by the user.

10. A system for configuring language support across an operating system and at least one application program, the system comprising:
    a memory storage; and
    a processing unit coupled to the memory storage, wherein the processing unit is operative to:
        determine whether characters present in the at least one application program are in a language writing system for which the language support is not currently enabled for the at least one application program;
        determine, in response to determining whether characters present in the at least one application program are in the language writing system for which the language support is not currently enabled for the at least one application program, that the language support is inconsistently configured for both the operating system and the at least one application program; and
        execute, in response to determining that the language support is inconsistently configured, an integrated process for receiving and implementing at least one first language setting for the operating system and at least one second language setting for the at least one application program, wherein the integrated process comprises:
            prompting the user to enable the language support that is not currently enabled, wherein the user is directed to a language support settings wizard to enable the language support for the language associated with the language writing system, wherein prompting the user to enable the language support that is not currently enabled comprises providing the user with an option to specify a period of time for which the language settings wizard is not to be executed in response to determining one of the following: that the user is working in the language associated with the language writing system, and that the user is working in any language not consistently deployed by the language support,
            displaying the at least one first language setting for the operating system and the at least one second language setting for the at least one application program, wherein displaying the at least one first language setting for the operating system and the at least one second language setting for the at least one application program comprises identifying at least one next step to the user, prompting the user to specify the at least one first language setting for the operating system and the at least one second language setting for the at least one application program, wherein a list of languages corresponding to the at least one first language setting and the at least one second language setting is displayed for the user to specify the language to be associated with the at least one first language setting and the at least one second language setting, and receiving, from the user, the at least one first language setting selection for the operating system and the at least one language setting for the at least one application program, wherein receiving the at least one first language setting selection for the operating system comprises receiving operating system standards and format settings for the language support, the operating system standards and format settings comprising at least one of the following: custom date formats, time formats, currency formats, and number formats.

11. The system of claim 10, wherein determining whether the language support is inconsistently configured comprises determining whether the user is working in the language associated with the language writing system for which the language support is not consistently deployed.

12. The system of claim 10, wherein the at least one first language setting for the operating system comprises at least one of the following: preferences for operating system language group support and preferences for an operating system keyboard layout.

13. The system of claim 12, wherein the at least one second language setting for the at least one application program comprises preferences for setting a default language for use in the at least one application program.

14. The system of claim 12, wherein the at least one second language setting for the at least one application program comprises preferences for the language support in a web browser application program.

15. The system of claim 12, wherein operating language group support comprises language groups categorized by a complex script language group, an ideographic language group, and an alphabetic language group.

16. The system of claim 10, wherein the language support settings wizard is operative to be executed manually by the user.

17. A computer-readable storage medium having computer-executable instructions stored thereon which, when executed, perform a method for consistently configuring language support for a document, the method executed by the computer-executable instructions comprising:

determining whether characters present in the document are in a language writing system for which the language support is not currently enabled for the document;

determining, in response to determining whether the characters present in the document are in the language writing system for which the language support is not currently enabled for the document, that a user is working in a language associated with the language writing system for which the language support is not consistently deployed; and executing a language settings wizard to enable the language support in response to determining that the user is working in the language associated with the language writing system for which the language support is not enabled, wherein executing the language setting wizard comprises:

prompting the user to enable the language support that is not currently enabled, wherein the user is directed to the language settings wizard to enable the language support, wherein prompting the user to enable the language support that is not currently enabled comprises providing the user with an option to specify a period of time for which the language settings wizard is not to be executed in response to determining one of the following: that the user is working in the language associated with the language writing system and that the user is working in any language not consistently deployed by the language support, displaying at least one first language setting for an operating system and at least one second language setting for an application program associated with the document, wherein the at least one first language setting and the at least one second language setting are associated with one of the following: the language corresponding to the language writing system and a plurality of language groups, the plurality of language groups being categorized by a complex script language group, an ideographic language group, and an language alphabetic group, prompting the user to specify the at least one first language setting for the operating system and the at least one second language setting for the at least one application program, wherein a list of languages corresponding to the at least one first language setting and the at least one second language setting is displayed for the user to specify the language to be associated with the at least one first language setting and the at least one second language setting, and receiving, from the user, the at least one first language setting selection for the operating system and the at least one language setting for the at least one application program, wherein receiving the at least one first language setting selection for the operating system comprises receiving operating system standards and format settings for the language support, the operating system standards and format settings comprising at least one of the following: custom date formats, time formats, currency formats, and number formats.

18. The computer-readable medium of claim 17, wherein determining whether the user is working in the language associated with the language writing system for which the language support is not enabled further comprises determining whether words exist in the document that are expressed in the language associated with the language writing system for which the language support is not enabled.

19. The computer-readable medium of claim 17, wherein the language support settings wizard is operative to be executed manually by the user.

* * * * *